United States Patent Office 3,582,416
Patented June 1, 1971

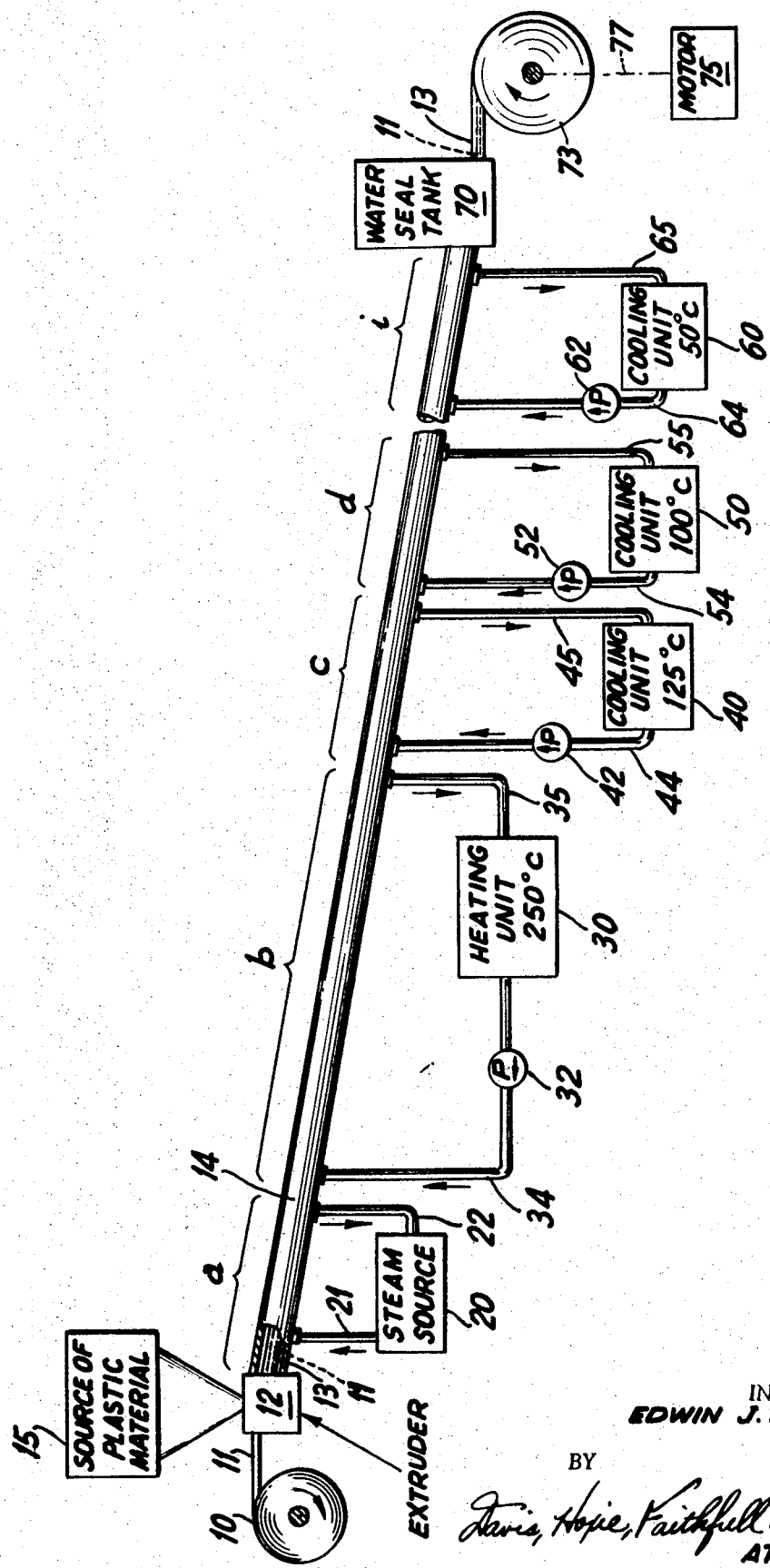

3,582,416
MANUFACTURE OF ELECTRIC CABLE
Edwin J. Merrell, Scarsdale, N.Y., assignor to Phelps Dodge Copper Products Corporation, New York, N.Y.
Filed Nov. 28, 1967, Ser. No. 686,004
Int. Cl. H01b 13/14
U.S. Cl. 156—51                                    1 Claim

ABSTRACT OF THE DISCLOSURE

An electric cable conductor has a plastic insulating layer uniformly and symmetrically disposed therearound at a relatively rapid production rate. Curing and cooling of the plastic is effected by drawing the conductor and insulation through a plurality of contiguous circulating fluid zones included in a catenary chamber, with such zones being characterized by monotonically decreasing operative temperatures.

DISCLOSURE OF INVENTION

This invention relates to the manufacture of electric cable and, more specifically, to a method and apparatus for depositing insulating material about a cable conductor.

A cylindrical plastic insulating layer for coaxial cable or the like is typically formed by extruding the plastic material in a heated, molten state about a metallic cable center conductor. Continuous production of such an insulated conductor has heretofore proceeded relatively slowly in view of heat transfer limitations obtaining when the plastic material is cured and cooled. Further, the plastic insulation in prior art production methods often departs from its extruded cylindrical form symmetrically disposed about the cable center conductor when exposed to the relatively high temperatures necessary to cure, or to thermoset, this material. The resulting eccentricity gives rise to undesirable changes in the electrical properties of the finished cable product.

In addition, prior art cable fabricating systems have illustratively traversed the extruded plastic through a cooling trough containing a coolant exhibiting a homogeneous, relatively low temperature. Such an organization heat shocks the plastic, thereby encouraging the formation of voids, or discontinuities in the plastic near the cable center conductor. Such discontinuities are exceedingly deleterious to the dielectric strength of the thermoset insulating layer.

It is therefore an object of the present invention to provide an improved method and apparatus for fabricating an electric cable conductor having an insulating layer thereabout.

More specifically, an object of the present invention is the provision of a method and apparatus for rapidly and continuously fabricating a cable conductor having an insulating layer therearound which exhibits a relatively high dielectric strength.

The above and other objects, features and advantages of the present invention are realized in a specific, illustrative method and apparatus described hereinafter in conjunction with the accompanying drawing which depicts a cable fabricating system arrangement which embodies the principles of the present invention.

Referring now to the system depicted in the drawing, there is included a reel 10 for supplying a metallic conductor 11 to extruding apparatus 12 of any conventional configuration. A source 15 supplies an uncured, molten plastic insulating material 13 to the extruder 12 which is operative to uniformly deposit the material 13 circumferentially around the conductor 11. The insulating material 13 may comprise, for example, polyethylene which can be thermoset, or cured, after extrusion to effect molecular cross-linking. Other suitable plastic insulating materials are similarly well known to those skilled in the art.

From the output of the extruder 12, the conductor 11 and its associated insulating layer 13 pass through a downwardly inclined catenary chamber or pipe 14, and are drawn through a water sealing tank 70 to a take-up reel 73 which is driven by a motor 75 through any suitable linkage 77. The pipe 14 is catenary in the sense that its diameter and canted orientation (illustratively straight and downward sloping in the drawing) are such as to accommodate the catenary-like natural disposition of the insulated conductor 11–13 without significant contact between the cable and pipe.

A steam source 20 applies steam to the catenary pipe 14 near the output of the extruder 12 via an inlet tube 21. An outlet 22 completes a closed steam system. The source 20 supplies steam at a relatively high temperature and pressure to partially effect curing of the plastic layer 13 as it is drawn through the chamber 14 zone $a$ shown in the drawing by the take-up reel 73. Typical operative parameters for the steam phase comprise a pressure of 600 p.s.i.a. and a corresponding temperature range at saturation of approximately 250° C.

To the right of the relatively short steam phase tube length $a$ is a further plastic curing zone $b$ which employs a fluid to effect heat exchanging. In particular, a heating unit 30 and a pump 32 are employed to rapidly circulate a pressurized fluid heated above the plastic thermosetting temperature, e.g. to 250° C., in the tube 14 zone $b$ between an inlet pipe 34 and an outlet pipe 35.

The liquid circulated in the zone $b$ (and also in the remainder of the tube 14 as described hereinafter) is selected to have a specific gravity approximately the same as that of the plastic material 13, i.e., in the approximate range of .86–1.1 for a great many polymers and specifically .93 for polyethylene. Thus water with a specific gravity of 1.0 is well suited for this purpose.

Absent a suitable liquid in the catenary tube 14, the force of gravity acting on the molten extruded plastic 13 in the pipe 14 area near the extruder 12 would produce a downward sagging of the plastic material relative to the conductor 11. Accordingly, the conductor 11 would be eccentrically fixed in the insulating layer 13. Such an insulated conductor configuration would give rise to deleterious changes in the electrical properties of the cable, i.e., a lowered breakdown voltage, and an altered iterative impedance.

However, by employing a suitable liquid in the catenary 14 of approximately the same specific gravity as the insulating material 13, a neutral buoyancy is produced by the fluid which essentially negates the undesirable gravity sagging. Accordingly, water is included throughout most (if not all as disclosed below) of the length of the catenary tube 14 to assure that the electrical insulating layer 13 will remain symmetrically disposed about the conductor 11.

To the right of the plastic curing zones $a$ and $b$ are a plurality of plastic insulation cooling zones $c$, $d$, . . . $i$, characterized by a monotonically decreasing temperature gradation, to cool and harden the plastic 13 while avoiding thermal shock. More specifically, the zones $c$, $d$, . . . $i$ illustratively comprise pressurized closed loops fluid circulation systems having characteristic operative temperatures of 125° C., 100° C., . . . 5° C., and respectively include a pump, a cooling unit, and inlet and outlet conduits 42, 40, 44 and 45; 52, 50, 54 and 55; . . . 62, 60, 64 and 65. In accordance with one aspect of my invention, an advantageous mode of system functioning is effected when the characteristic temperatures for selected cooling zones are adjusted to correspond with the temperatures at which the plastic 13 undergoes physical changes of state, e.g., the point at which polyethylene attains a hardened crystalline state.

During a typical cycle of system operation, the plastic material 13 supplied by the source 15 is extruded by the unit 12 about the center conductor 11. The insulating material 13 is advantageously heated to a molten, plastic state, but to a temperature which is less than that required to effect cross-linking of the polyethylene or other polymer material.

The insulated cable 11–13 is first drawn through the steam phase $a$ and the first hot water zone $b$ where it is subjected to a temperature of 250° C. This temperature is sufficient to initiate thermosetting of the plastic 13, thereby changing the plastic curing reaction from an endothermic to an exothermic condition while effecting molecular cross-linking. The curing zone $b$ is relatively large and may comprise, for example, sixty percent of the length of the catenary chamber 14 (the zone $b$ is shown of a lesser relative size in the drawing for purposes of clarity). It is observed that the steam phase zone $a$ is employed since it isolates the pressurized water zones from the output of the extruder 12, and because steam is a commonly available heating source in commercial cable fabricating facilities. It is observed, however, that the 250° pressurized water zone $b$ may alternatively extend to the extruder 12 to completely embody the curing medium, with the internal extruding pressure being sufficient to effect the desired seal. The rapid liquid flow in the heating zone $b$, and also in each of the cooling zones $c, d, \ldots i$ is effective to produce a vigorous heat exchange free from stagnant surface layer effects.

After the insulated cable configuration 11–13 is drawn by the reel 73 from the curing zone $b$, it successively traverses through the temperature graduated cooling zones $c, d, \ldots i$. This gradual cooling process avoids hardening the outer periphery of the plastic 13 while the interior portion thereof is still molten, as is characteristic of single temperature shock cooling systems. Such heat shock characteristic of prior art arrangements produces uneven plastic hardening and gives rise to void or dislocations in the insulating material 13 since the inner plastic near the conductor 11 shrinks during cooling, while there can be no corresponding shrinkage of the already hardened periphery of the layer 13. Such voids severely reduce the dielectric strength of the insulation 13, and thereby also the breakdown voltage for the composite coaxial cable.

The cooled and hardened insulated conductor 11–13 is drawn from the last cooling zone $i$ onto the driven takeup reel 73 via a water sealing tank 70. The cable input to the tank 70 may illustratively comprise a series of cascaded rubber grommets having an inner diameter just equal to, or slightly smaller than the nominal outer diameter of the plastic 13. Other well known sealing embodiments for passing the cable elements 11–13, but not the pressurized cooling fluid may alternatively embody the input of the tank 70.

As observed above, the water buoyancy offsets the gravity effect and constrains the molten, or semi-molten plastic 13 to retain its symmetrical disposition about the conductor 11 for most, if not all, of the plastic curing and cooling transversal through the catenary chamber 14. Accordingly, high quality cable may be fabricated at a relatively rapid rate by the catenary system depicted in the drawing. Such a catenary system compares favorably with the expensive and relatively slow prior art vertical cooling chambers which often have been resorted to for purposes of obviating sag or eccentricity in the insulating material associated with the action of gravity in horizontal or catenary organizations.

The above-described method and apparatus are only illustrative of the principles of the present invention. Numerous modifications thereof may be readily devised by those skilled in the art without departing from the spirit and scope of the invention. For example, the method and apparatus may be employed to fabricate insulated electric conductors for use per se, or for employment in differing electric cable structures. Illustrative of such cables are coaxial cables employing concentric conducting members separated by an insulating dielectric, and cables having plural insulated conductors in a common outer sheath.

What is claimed is:

1. In combination in an arrangement for fabricating a coaxial cable conductor having a plastic insulating layer therearound, means for disposing said plastic insulating layer about said conductor while in an uncured state, a catenary chamber connected to the output of said insulating layer disposing means, means for supplying heated steam in said chamber in proximity to said plastic disposing means to initiate curing of said insulating layer, said catenary chamber portion remote from said steam portion with respect to said plastic disposing means comprising a plurality of heat exchanging zones exhibiting characteristic temperatures which monotonically decrease in a direction away from said insulating layer disposing means, each of said heat exchanging zones including a different closed forced circulation fluid system including inlet and outlet conduit means, a circulating pump, and a heat exchanger, at least one forced circulating fluid system comprising means for maintaining the characteristic temperature of the associated system at a temperature corresponding to the temperature at which a physical change of state occurs in said curing plastic insulating layer.

References Cited

UNITED STATES PATENTS

| | | | |
|---|---|---|---|
| 2,561,820 | 7/1951 | Ramsey et al. | 264—348 |
| 2,732,592 | 1/1956 | Tunnidiff et al. | 264—174 |
| 3,130,447 | 4/1964 | Karl et al. | 264—348X |
| 3,413,167 | 11/1968 | Trill | 156—51 |

FOREIGN PATENTS

| | | | |
|---|---|---|---|
| 552,192 | 8/1953 | Canada | 264—174 |

VERLIN R. PENDEGRASS, Primary Examiner